United States Patent
Lukic et al.

(10) Patent No.: US 8,441,705 B2
(45) Date of Patent: May 14, 2013

(54) ROTARY CONSTRUCTION LASER WITH STEPPER MOTOR

(75) Inventors: Sasha Lukic, Buchs (CH); Manfred Ammann, Lauterach (AT)

(73) Assignee: Hilti Aktiengesellshaft, Schaan (LI)

( * ) Notice: Subject to any disclaimer, the term of this patent is extended or adjusted under 35 U.S.C. 154(b) by 562 days.

(21) Appl. No.: 12/536,441

(22) Filed: Aug. 5, 2009

(65) Prior Publication Data

US 2010/0033789 A1 Feb. 11, 2010

(30) Foreign Application Priority Data

Aug. 6, 2008 (DE) .................. 10 2008 041 031

(51) Int. Cl.
*G02B 26/08* (2006.01)
*G02B 26/10* (2006.01)
*G02B 26/12* (2006.01)
*G04C 13/11* (2006.01)
*H02K 37/00* (2006.01)

(52) U.S. Cl.
USPC .............. 359/221.3; 359/212.2; 310/49.01

(58) Field of Classification Search .... 359/196.1–226.3; 250/231, 234–236; 310/49.01–49.55, 179–180, 310/67 R; 347/242, 260–261
See application file for complete search history.

(56) References Cited

U.S. PATENT DOCUMENTS

| 3,846,026 | A | 11/1974 | Waters | |
|---|---|---|---|---|
| 2002/0050963 | A1* | 5/2002 | Conemac et al. | 345/82 |
| 2003/0009891 | A1 | 1/2003 | Ohtomo et al. | |
| 2003/0021497 | A1* | 1/2003 | Kandori et al. | 382/323 |
| 2004/0119002 | A1* | 6/2004 | Bush et al. | 250/234 |
| 2006/0119217 | A1* | 6/2006 | Yang | 310/309 |
| 2008/0252957 | A1* | 10/2008 | Thibout et al. | 359/223 |
| 2009/0127447 | A1 | 5/2009 | Ammann et al. | |
| 2010/0104291 | A1 | 4/2010 | Ammann et al. | |

FOREIGN PATENT DOCUMENTS

| DE | 4324478 A1 | 1/1995 |
|---|---|---|
| DE | 10231552 A1 | 1/2003 |
| EP | 1001251 A1 | 5/2000 |
| EP | 2063222 A2 | 5/2009 |

OTHER PUBLICATIONS

European Search Report dated Mar. 22, 2011 (8 pages) for European patent application EP 09 16 4920, with 1 page, in English.

* cited by examiner

*Primary Examiner* — Alessandro Amari
*Assistant Examiner* — Kimberly N Kakalec
(74) *Attorney, Agent, or Firm* — Crowell & Moring LLP

(57) ABSTRACT

A rotary construction laser is disclosed. The rotary construction laser having a deflection device rotatably mounted around an axis of rotation for emitting laser light as well as a stepper motor for rotating the deflection device around the axis of rotation.

8 Claims, 3 Drawing Sheets

ROTARY CONSTRUCTION LASER WITH STEPPER MOTOR

This application claims the priority of German Patent Document No. 10 2008 041 031.4, filed Aug. 6, 2008, the disclosure of which is expressly incorporated by reference herein.

BACKGROUND AND SUMMARY OF THE INVENTION

The invention relates to a rotary construction laser having a laser beam that rotates at least in segments.

Rotary construction lasers having a laser beam that rotates at least in segments are used primarily in the construction industry in order to define horizontal, vertical, or defined inclined planes on objects located in the vicinity of the rotary construction laser such as walls, ceilings, and/or floors of a room and to visibly identify laser markings generated by the projection of the laser beam.

Known rotary construction lasers feature a laser unit for generating laser light, for example, in the form of a laser beam. In addition, a deflection device is provided, which is rotatably mounted around an axis of rotation. The axis of rotation may cross a beam axis of the laser light emitted by the laser unit at least at one intersection and deflect it at an angle of 90° for example. By rotating the deflection device around the axis of rotation, the deflected laser light can now be emitted rotatively starting from the axis of rotation and be projected on the objects located in the vicinity of the rotary construction laser.

Rotating the deflection device around the axis of rotation with the aid of a rotary motor is known. Direct current motors that can achieve a rotational motion are used for this purpose.

In many application cases, it is sufficient to generate a laser marking only in a partial area, for example, when during operation at the construction site work is only taking place in a partial area of a room. In this case, it is desirable to generate the brightest possible laser markings having good visibility.

Because rotary construction lasers are frequently operated independently of the power supply network with the aid of an accumulator (battery), low power consumption, and therefore, the longest possible service life of the rotary construction laser should simultaneously be the aims.

The objective of the invention is disclosing a rotary construction laser which meets the above-mentioned requirements.

In the rotary construction laser of the present invention, the rotary construction laser has a deflection device rotatably mounted around an axis of rotation for deflecting laser light. In addition, a stepper motor for rotating the deflection device around the axis of rotation is provided.

The deflection device can be used to deflect the laser light, which can be generated by a laser light source. The laser light source in this case may be arranged separately from the deflection device. Alternatively, it is also possible for the laser light source to be connected to the deflection device and/or be part of the deflection device. In this case, the laser light source is rotatable with the deflection device.

In order to deflect the laser light, the deflection device may have a prism, such as a pentaprism, for example, through which the incident laser light can be deflected at a predefined angle, such as 90° for example.

In this case, a beam axis of the laser light may cross the axis of rotation at an intersection or coincide with the axis of rotation. When the deflection device is rotated around the axis of rotation, the laser light can be emitted rotatively starting from the axis of rotation, for example, through the rotating prism. Thus, for example, when deflecting a laser beam formed by the laser light with a deflection angle of essentially 90°, a laser beam exiting rotatively from the axis of rotation can be generated, which can pass through a rotational plane that is perpendicular to the axis of rotation.

When operating the rotary construction laser, it is possible to generate visible laser markings on objects in the vicinity of the rotary construction laser through a projection of the laser beam. These markings originate at projection points at an intersection of the rotational plane with a projection area formed by a surface of the objects. The projection points can be determined according to the laws of geometry based on the position of the axis of rotation and an angle of rotation of the deflection device, from which an illumination angle of the emitted laser light is produced.

By using the stepper motor to rotate the deflection device around the axis of rotation, the movement of the deflection device, and therefore, the exit angle of the exiting laser beam can be suitable controlled.

A stepper motor is a synchronous motor, which can generate a rotative driving torque through a controlled, incrementally rotating electromagnetic field. The electromagnetic field can be generated by stator coils firmly positioned in the stepper motor and by modifying the current feed to the stator coils. Through this, a rotation, for example, of a permanent magnet around a minimum angular displacement per step or a multiple of the angular displacement per step can be achieved. In addition, stepper motors can be operated with a uniform rotary field and therefore generate a uniform, rotative driving torque.

Because the rotation essentially follows the field generated by the stator coils exactly, stepper motors can be operated without sensors for position feedback such as rotary encoders and without additional components such as commutators. As a result, stepper motors are qualitatively high-grade and rugged as well as cost-effective at the same time.

A rotary construction laser can have a stepper motor with a rotor for generating the driving torque. Furthermore, a control device for triggering the stepper motor can be provided. The triggering may be accomplished by a control default, which specifies an angle of rotation and/or a rotational direction and/or a number of rotational steps for the rotor.

Due to the rotating electromagnetic field generated by the stator coils, an angle of rotation specified by a control default, which can correspond, for example, to a multiple of a minimum angular displacement per step of the stepper motor, can be converted simply into a rotative driving torque with a corresponding angle. A change in the rotational direction of the driving torque can be achieved by adjusting the electromagnetic field. Using a stepper motor therefore makes it possible to realize the angle of rotation, rotational direction, and rotational steps specified by the control unit. As a result, the laser markings can be generated and modified incrementally.

In the case of a rotary construction laser, the control device can repeat a control sequence with one or more control defaults regularly and with a pre-definable repeat frequency. A laser marking with a desired marking pattern can be produced through this. Such an operating mode of the rotary construction laser is designated as a "scanning operation" or "scanning."

For example, a linear laser marking having a constant length can be generated through a control sequence, which specifies a change in the rotational direction with a constant angle of rotation, and which repeats with a suitable repeat frequency. The repeat frequency in this case indicates a repeat rate for triggering the stepper motor with the control sequence. Thus, it is possible to move the deflection device back and forth in the specified angle of rotation, which is repeated with the specified repeat frequency. This produces a uniform illumination of the angle of rotation, through which a line segment with uniform visibility is generated on a projection area in the vicinity of the rotary construction laser as a laser marking. It is possible to achieve good visibility of the laser marking because of the concentration of laser light on the line segment.

Furthermore, it is possible with a suitable control sequence to generate laser markings, which have marking segments, which have increased visibility, and therefore, appear brighter than other segments. This can be achieved, for example, by a control sequence which specifies that the deflection device be moved back and forth while generating the marking segments. Thus, it is possible to cause the laser light in the control sequence to be projected more frequently in the corresponding marking segments. It is possible, as a result, to concentrate a pre-definable portion of the energy of the laser light on the corresponding marking segments.

It is likewise possible to illuminate the marking segments more strongly by slowing down the rotation of the deflection device in a corresponding area. Thus, it is possible to specify different rotational speeds for predetermined angular areas in such a way that emitted laser light passes through segments of the marking more slowly or more quickly, respectively. By more slowly passing through a predefined angle of rotation segment, the energy of the emitted laser light is concentrated on the given angle of rotation segment, thereby achieving an improved visibility of the respective marking segment. The respective marking segment therefore appears brighter than other segments of the laser marking, for which the laser light passed through at a higher rotational speed.

Because of the reflected laser light, a laser marking can thus be generated with several marking segments lying a line, which have different levels of brightness.

Using a stepper motor makes it possible to exactly trigger and realize the rotation motion. As a result of this, flickering, for example, at the end of the laser marking or the marking segments, can be prevented when generating the marking pattern. This flickering may arise by switching the rotational direction and the braking that is required for this when using a direct current motor. Similarly, the precise implementation of the control sequence by the stepper motor can also prevent a "migrating" of the laser markings, i.e., a local displacement of the projection at a fixed projection area over an observation period. The migration can arise, for example, when using an unsuitable drive though displacements of the angle of rotation of the deflection device in the case of slight deviations of the rotational motion of the rotor from the defaults of the control sequence.

By using a suitable control sequence and the default of a suitable repeat frequency, good visibility of the marking even when using a weak laser can be achieved. As a result, it is possible to equip the rotary construction laser with a comparatively weak, and therefore, also cost-effective laser light source. Therefore, a rotary construction laser can be equipped with a cost-effective conventional laser, which can be fainter than, for example, a comparatively expensive green laser, which also has a high level of power consumption. Using a weak laser light source is beneficial for safety when using the rotary construction laser at a construction site because laser light with greater energy can represent, for example, a hazard to an observer's eye if one looks into the beam. As a result, legal requirements for maximum permissible laser light strengths can be met without difficulty.

The repeat frequency for a rotary construction laser can be specified in such a way that a marking generated by the emitted laser light is perceptible to the human eye in an essentially flicker-free manner. To this end, the repeat frequency can be selected, for example, essentially from a range of sequence pass-throughs per second of up to 20 sequence pass-throughs per second. An illumination of the laser marking that is repeated with a corresponding frequency cannot be detected by the eye of the observer, whereby the marking is perceptible as flicker-free and without any flickering at the ends. Illumination takes place as a result "with a higher resolution than the resolution of the human eye."

Implementing a control sequence repeated with this type of repeat frequency can be realized with the stepper motor with such a high level of accuracy in a rotational movement of the deflection device that the visibility of the generated laser marking is significantly better than is the case with other drives.

In a further embodiment, a transmission pulley can be provided which can transmit a torque generated by the stepper motor to the deflection device. Different types of belts can be used for transmission, such as, for example, flat belts, V-belts, ribbed V-belts, toothed belts, or round belts. The belt guidance can be selected in accordance with a structural design of the rotary construction laser. By using the transmission pulley, quiet running can be achieved when the deflection device is rotated even in the case of high repeat frequencies and/or with control sequences that have frequent changes in the rotational direction and/or the rotational speed. Vibrations that can arise, for example, in the case of changes in the rotational speed or the rotational direction can thereby be damped and noise can be avoided. A device for setting and adjusting the belt tension can be provided.

In one embodiment of this variant, the rotor can be coupled with a drive shaft, wherein the drive shaft has a first belt pulley. The deflection device can have a rotation shaft with a second belt pulley. In this embodiment, the transmission pulley can transmit the torque from the first belt pulley to the second belt pulley.

A suitable selection of the diameters of the belt pulleys makes it possible to flexibly adjust a rotational speed of the deflection device to the rotational speed of the stepper motor. The distance of the drive shaft from the rotation shaft can also be selected corresponding to the structural design of the rotary construction laser. In addition, ball bearings can be provided for mounting the rotation shaft and the drive shaft, which further improves the running characteristics.

In a further variant of this embodiment, a serrated toothed belt can be selected as the transmission pulley. The first and the second belt pulleys can each be formed by toothed belt pulleys.

Using a serrated toothed belt, which can transmit the torque via the toothed belt pulleys, makes a precise transmission of the torque possible through a positive coupling between the transmission pulley and the first and second belt pulleys. As a result, a high level of quiet running with low wear can be achieved with simultaneously precise control.

In a variant of this embodiment, a first number of teeth of the first toothed belt pulley and a second number of teeth of the second toothed belt pulley are selected in such a way that a stepping down of a rotational speed of the rotor is achieved. For example, a stepping down of 20:60 can essentially be achieved. This allows the rotational speed of the stepper motor to be realized at a rotational speed for rotating the deflection device, which makes it possible to generate the laser markings with high visibility.

A rotary construction laser can also have a monitoring device, which as a rotational sensor monitors a rotation of the deflection device. For example, monitoring the rotation of the drive shaft or the rotation shaft driven by the stepper motor can be conducted during operation of the rotary construction laser. This makes it possible to also operate the stepper motor with a low current, for example as compared with a nominal current, and with a minimum torque. This type of operation of the stepper motor at a "starvation" level makes it possible to operate the rotary construction laser with low power consumption and thereby facilitate a longer service life of the rotary construction laser, for example, in battery operation.

In one embodiment, the monitoring device has a coding disk with optical, electric, magneto-electric, or mechanical scanning that is coupled with the rotation shaft or the drive shaft. The coding disk can function as a rotary encoder and, for example, emit predetermined pulses for an angle of rotation of the rotation shaft and/or of the drive shaft that has been covered. The number of pulses can be used as a measure for the angle of rotation covered. For this purpose, the coding disk may be firmly mounted on the drive shaft or the rotation shaft. It can be divided, for example, into individual segments, which can be provided with a segment marking. A sensor can detect the segment marking and thereby facilitate a determination of the angle of rotation being passed through by the coding disk.

For example, individual segments of the coding disk can be alternatingly light-transmitting or non-light-transmitting. A scanning light transmitted by a light source on one side of the coding disk can trans-illuminate the coding disk. The light that is modulated through the coding disk can be received by light sensors on the other side of the coding disk. This makes it possible to draw a conclusion about the position of the coding disk. It is possible as an alternative or in addition for the coding disk to send electrical or magnetic pulses, which are scanned by corresponding sensors. Mechanical scanning is also possible.

In a further variant of this embodiment, a regulating device is provided for regulating the rotation of the deflection device on the basis of a signal from the monitoring device. This makes it possible to adjust the rotation of the deflection device when it is discovered that a rotation of the deflection device has been omitted, for example, because the stepper motor did not implement individual control defaults.

In one variant of this embodiment, the regulating of the rotation of the deflection device can be accomplished by the control device adjusting a current strength of a current fed to the stepper motor and/or by specifying a correction sequence, which includes one or more control defaults.

Adjusting the current strength can be necessary when such little current is fed to the stepper motor that individual control defaults are not implemented because the electrical field generated by the stator coils was too weak to move the rotor. In this case, the current strength fed to the stepper motor can be increased by the regulating device in such a way that the electrical field generated by the stator coils is strong enough to rotate the rotor.

For example, the current strength fed to the stepper motor can be a function of environmental conditions when operating the rotary construction laser. As a result, it is possible that when it is being used in a cold environment, lubricants are more viscous and bearings are more sluggish than when it is being used in a warm environment. As a result, for use in a cold environment, it may be necessary to select a higher current strength to feed to the stepper motor than when it is being used in a warm environment.

Adjusting the current strength can be accomplished, for example, by turning resistance cascades on and off. It is also possible to adjust the energy being fed by controlling the pulse width, i.e., though the on-time within the cycle (pulse duration).

Adjusting the current strength makes it possible to operate the stepper motor with the lowest possible power consumption. Therefore, the current strength can be reduced first of all until a predefined threshold value is reached or the monitoring device signals the absence of steps during the rotation of the deflection device. After the absence of steps, a slight increase in the current strength may be expedient.

By regulating the current strength it is possible to operate the rotary construction laser with the lowest possible power consumption and thereby achieve the longest possible service life, for example, with battery operation.

When the monitoring device detects that individual control defaults were not implemented in a corresponding rotation of the deflection device, it can be expedient to correct the position of the deflection device. The correction sequence, with which the stepper motor can correct a position of the deflection device, can be used for this. Thus, for example, after the absence of rotational steps of the stepper motor, a laser marking generated by the rotary construction laser can be projected in a displaced manner until a re-alignment of the deflection device is achieved by the correction sequence. A change in the timing can also be achieved by the correction sequence. As a result, perceptible interference in a projection of the laser marking can be prevented.

In one embodiment, the regulating device can be completely or partially integrated into the control device. This means the control device can be designated or viewed as the regulating device. The integration of the regulating device into the control device makes a simple design of the rotary construction laser possible because little construction space is required, and therefore, simple contacting and power supply of both devices are rendered possible as well as simple signal transmission between the devices.

In a further embodiment of the invention, a rotary construction laser with a deflection device rotatably mounted around an axis of rotation for emitting a laser beam and a stepper motor for rotating the deflection device around the axis of rotation is operated with a method, which includes triggering the stepper motor by regularly specifying a control sequence that is repeated with a pre-definable repeat frequency. The control sequence can include one or more control defaults of the angle of rotation and/or a rotational direction and/or a rotational speed and/or a number of rotational steps for the stepper motor. The control sequence and the repeat frequency can be selected in such a way that when the deflection device rotates around the axis of rotation, the laser light passes through one or more predetermined illumination areas more frequently and/or more slowly than other areas. The illumination areas in this case can be described by the default of the corresponding illumination angle in the rotational plane.

An illumination area may be passed through, for example, more frequently than another area if the laser light bundled into a laser beam is moved back and forth multiple times in the illumination area, while other areas are passed through only once or not at all. An illumination area can be passed through more slowly than other areas if the rotational speed of the deflection device is reduced in the illumination area.

By passing through the illumination area frequently or slowly, the energy of the laser light can be concentrated in the illumination area so that a laser marking generated in the illumination area appears brighter and has better visibility than in other areas.

It is possible to pass through predetermined illumination areas exclusively and other areas not at all. It is possible as an alternative or in addition to pass through predetermined illumination areas more frequently and/or more slowly than other areas. This makes it possible to generate laser markings which are composed of marking segments having different levels of brightness.

Because of the technical possibilities of the stepper motor, the method for operating the rotary construction laser with the stepper motor permits controlled rotational movements with predefined rotational speeds in predefined rotational angle areas. As a result, with a suitable selection of the repeat frequency, i.e., the repeat rate for the control sequence, it is possible for the laser marking to be perceived by the human eye in an essentially flicker-free manner. Thus, a significantly better visibility of the generated laser markings can be achieved than is the case with the generation of similar markings with other drives.

One embodiment of the method furthermore includes monitoring the rotation of the deflection device and increasing the current strength of the current fed to the stepper motor when the rotation of the deflection device does not correspond to the control sequence.

By monitoring the rotation of the deflection device it is possible to detect that the rotation of the deflection device does not correspond to the control sequence. This can be caused by the stepper motor not being able to implement individual control defaults due to a power supply that is too low. In this case, the current strength of the current fed to the stepper motor can be increased. This makes it possible to regulate the current fed to the stepper motor to a low value, and therefore, facilitate the longest possible service life of the rotary construction laser, for example, in battery operation.

One embodiment of the method can also include the monitoring of the rotation of the deflection device. Moreover, triggering the stepper motor can be accomplished by a correction sequence of control defaults when the rotation of the deflection device does not correspond to the control sequence. The correction sequence can be selected such that interference that is perceptible to the human eye can be prevented and/or corrected. This makes it possible, after the absence of steps of the stepper motor, to correct any possible displacement of the marking generated by the laser light, for example, by re-displacement.

This and other features of the invention will be explained in greater detail in the following with the aid of the accompanying figures.

DETAILED DESCRIPTION OF THE DRAWINGS

Figure 1:
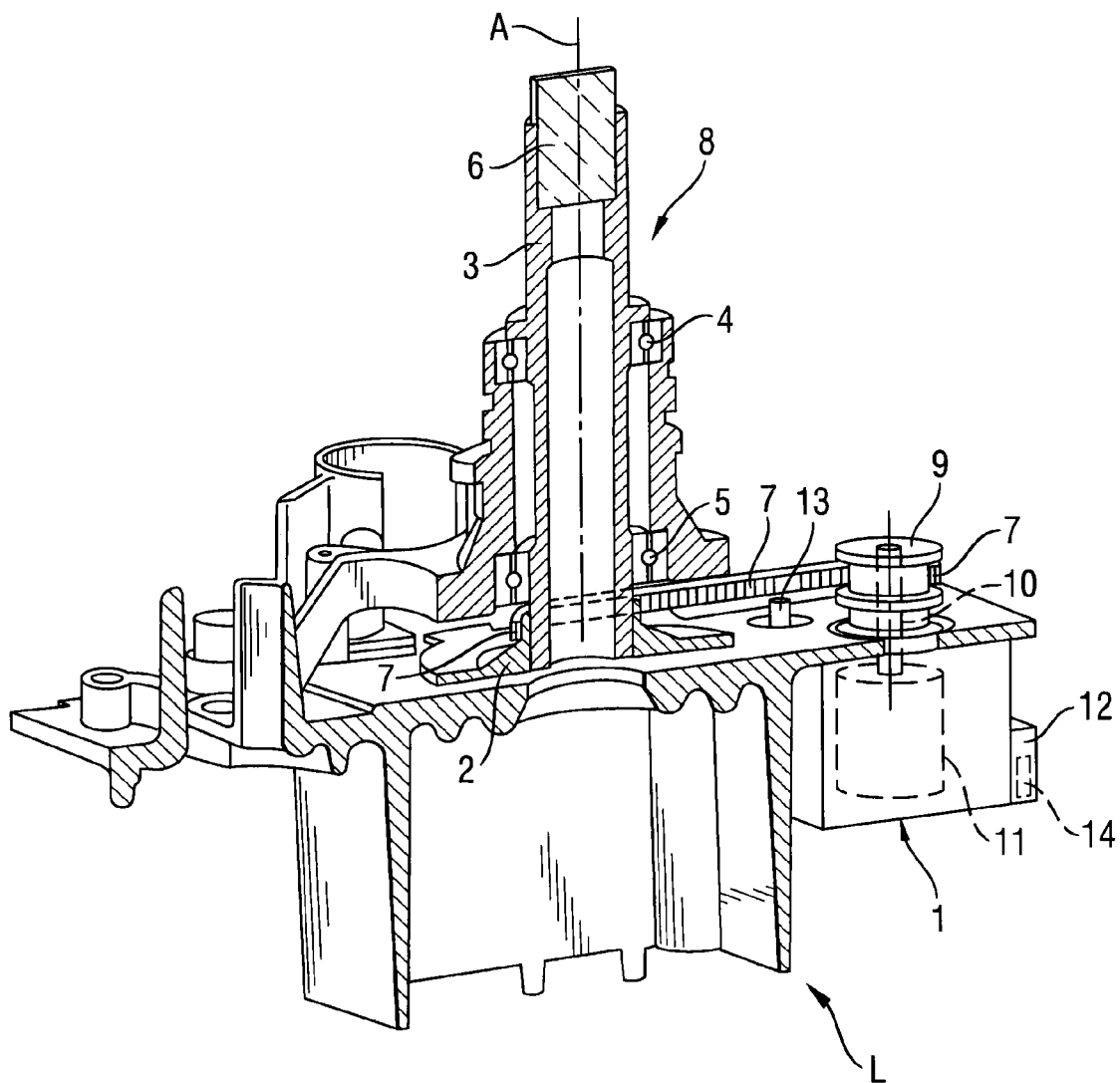
FIG. 1 illustrates components of a rotary construction laser with a stepper motor.

FIG. 1 schematically depicts components of a rotary construction laser with a stepper motor and their interaction. A stepper motor 1 can transmit a driving torque to a toothed belt pulley 2 with the aid of a serrated toothed belt (not shown). The toothed belt pulley 2 is part of a deflection device of a rotary construction laser and is firmly coupled with the deflection device. The driving torque of the stepper motor 1 can therefore be transmitted via the toothed belt pulley 2 to a rotation shaft 3 of the deflection device, which is mounted with the ball bearings 4 and 5. A prism 6 that can be used to deflect laser light is arranged on the rotation shaft 3. When the rotation shaft 3 rotates, the prism 6 can transmit the laser light as a laser beam being emitted rotatively from an axis of rotation of the deflection device. Laser markings can be generated by the laser beam on projection areas, which can be formed, for example, by surfaces of the objects surrounding the rotary construction laser.

By using the stepper motor 1 to generate the driving torque, a largely exact realization of a control default of an angle of rotation and/or a rotational direction and/or a rotational speed and/or a number of steps for the rotation shaft 3, and therefore, for the transmission of the laser light, can be achieved. By triggering the stepper motor 1 with a control sequence comprised of one or more control defaults and by repeating the control sequence with a pre-definable repeat frequency, a laser marking can be generated by the laser beam emitted from the deflection device which can have one or more marking segments having different levels of brightness.

Figure 2:
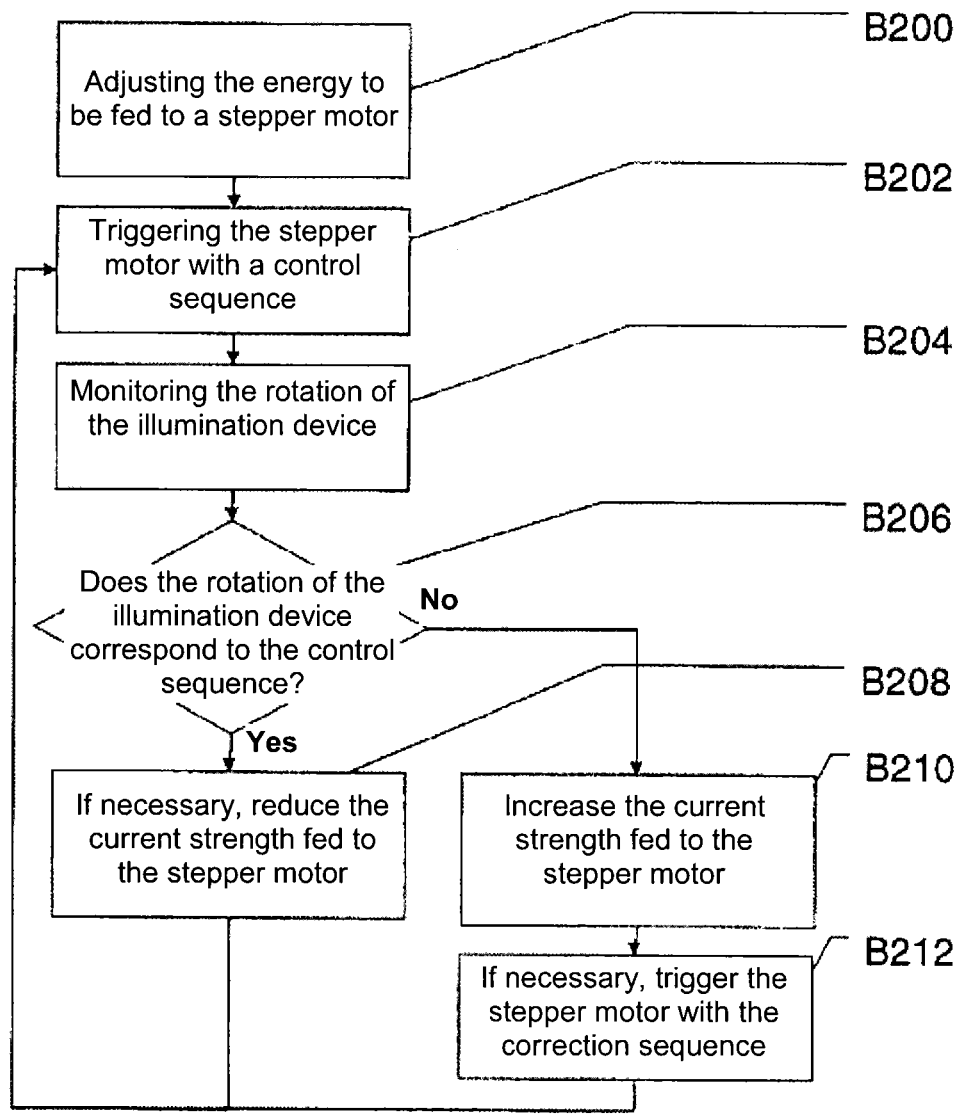
FIG. 2 is a flow chart to illustrate a method for operating a rotary construction laser having a stepper motor.

FIG. 2 illustrates a method for operating a rotary construction laser such as that in FIG. 1.

In B200 the energy to be fed to the stepper motor 1 is adjusted. The current strength can be determined in accordance with fixed manufacturer requirements, user selection, or with respect to the charging condition of an accumulator that is supplying energy.

In B202 the stepper motor 1 is triggered with a control sequence. The control sequence can be determined in accordance with fixed manufacturer requirements or a user selection and described in such a way that is suitable for generating a laser marking. The control sequence causes the stepper motor 1 to transmit a driving torque corresponding to the control sequence via the serrated toothed belt to the toothed belt pulley 2, and thus, to the rotation shaft 3 and the prism 6. This makes the deflection device rotate in accordance with the control sequence. The control sequence can be repeated in an iteration (not shown) with a predefined repeat frequency.

In B204 the rotation of the deflection unit is monitored continuously. In this case, a check can be made to see whether the rotation of the deflection device corresponds to the control sequence.

Based on a monitoring result, a decision is made in B206 about which steps of the method to continue with.

If the rotation of the deflection device corresponds to the control sequence, it can be concluded from this that the stepper motor 1 is being adequately supplied with current. In this case, if applicable, the current strength fed to the stepper motor 1 can be further reduced, as shown in B208, so as to operate the stepper motor 1 with the lowest possible power consumption. A reduction can be undertaken, for example, with respect to a remaining run time or a filling level of the accumulator. Following this, a re-triggering of the stepper motor 1, as described in B202, can be undertaken.

If it is determined in B206 that a rotation of the deflection device does not correspond to the control sequence, the current strength fed to the stepper motor 1 can be increased, as shown in B210. Thus, it is possible to achieve a situation where the stepper motor 1 is being operated with adequate current strength.

In addition, it can be necessary in this case to trigger the stepper motor 1 with a correction sequence as shown in B212. This makes it possible to prevent and/or correct any interference in the projection of the laser marking that is perceptible to the human eye.

Afterwards, the method in B202 can be continued with the triggering of the stepper motor 1 with another control sequence.

The method described in FIG. 2 makes it possible to operate a rotary construction laser with the stepper motor 1 with the regulation of the current strength fed to the stepper motor 1 to the lowest possible value. Interference that can be caused by too low a power supply can be corrected by the correction sequence.

Figure 3:
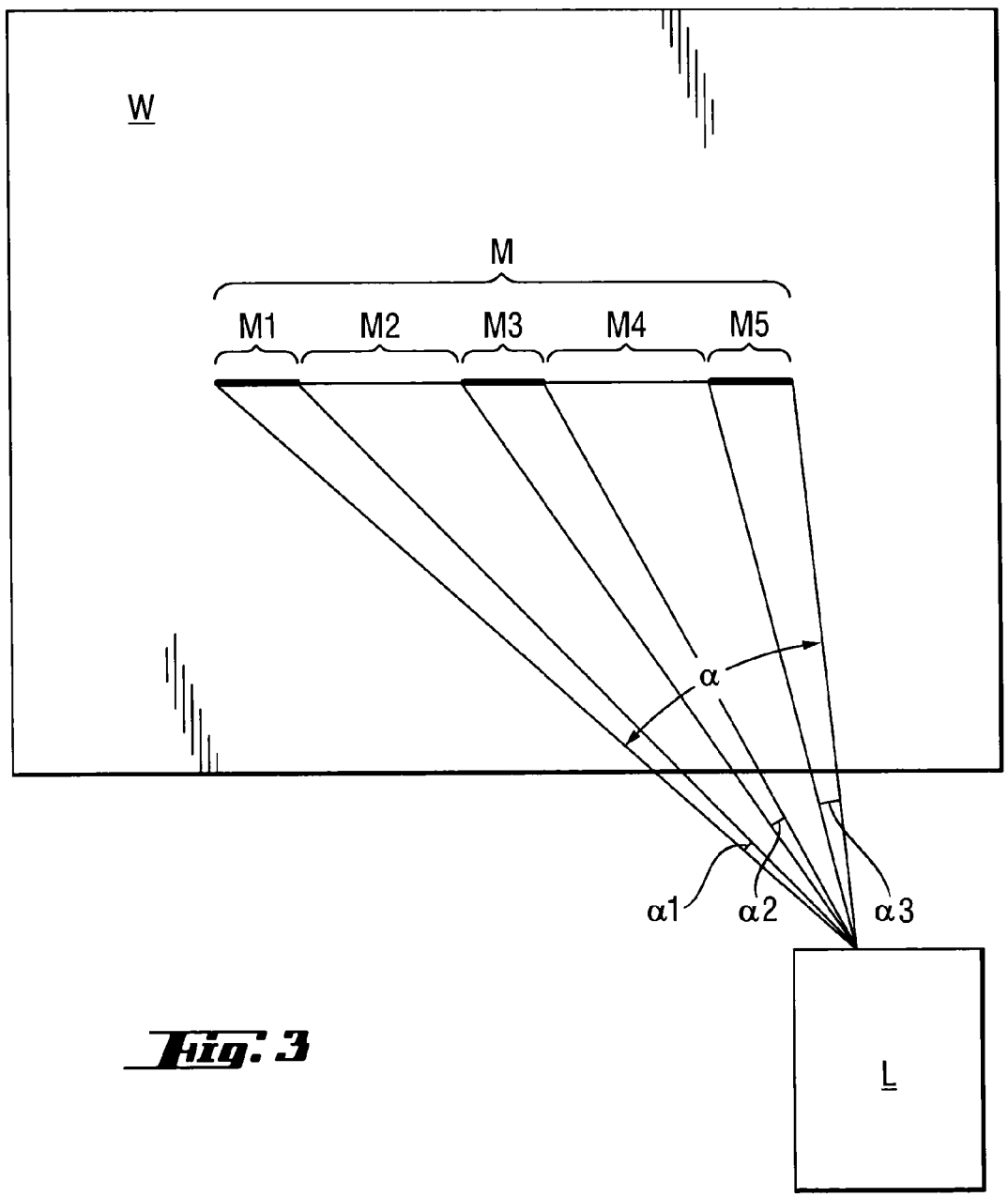
FIG. 3 is a marking that can be generated with a rotary construction laser having a stepper motor.

FIG. 3 shows a marking M on a wall W that can be generated with a rotary construction laser L having a stepper motor. The marking M follows a line and has five marking segments M1, M2, M3, M4, and M5. The marking segments M1, M3, and M5 shown in bold have a greater level of brightness, and therefore, better visibility than the marking segments M2 and M4.

A laser beam emitted by the rotary construction laser L is used to generate the marking M in an illumination area described by an illumination angle $\alpha$. The partial illumination angles $\alpha 1$, $\alpha 2$, and $\alpha 3$ are passed through more frequently and/or more slowly by the laser than the other portions of the angle $\alpha$ so that the marking segments M1, M3, and M5 appear brighter and have better visibility than the marking segments M2 and M4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A rotary construction laser, comprising;
    a deflection device rotatably mounted around an axis of rotation for emitting laser light;
    a stepper motor for rotating the deflection device around the axis of rotation;
    a monitoring device that monitors a rotation of the deflection device;
    a regulating device that regulates the rotation of the deflection device on a basis of a signal from the monitoring device;
    a control device that triggers the stepper motor; and
    a transmission pulley which transmits a torque generated by the stepper motor to the deflection device;
    wherein the regulating device regulates the rotation of the deflection device via the control device by the control device adjusting a strength of a current fed to the stepper motor and/or by specifying a correction sequence which includes one or more control defaults.

2. The rotary construction laser according to claim 1, wherein:
    a rotor of the stepper motor is coupled with a drive shaft, wherein the drive shaft has a first pulley;
    the deflection device has a rotation shaft with a second pulley; and
    the transmission pulley transmits the torque from the first pulley to the second pulley.

3. The rotary construction laser according to claim 2, wherein the transmission pulley is a toothed belt and wherein the first and the second pulleys are each toothed belt pulleys.

4. The rotary construction laser according to claim 3, wherein a first number of teeth of the first toothed belt pulley and a second number of teeth of the second toothed belt pulley result in a stepping down of a rotational speed of a rotor of the stepper motor to 20:60.

5. A method for operating a rotary construction laser which has a deflection device rotatably mounted around an axis of rotation for emitting laser light and a stepper motor for rotating the deflection device around the axis of rotation, comprising the step steps of:
    triggering the stepper motor by regularly specifying a control sequence that is repeated with a pre-definable repeat frequency, which control sequence includes one or more control defaults of an angle of rotation and/or a rotational direction and/or a rotational speed and/or a number of rotational steps for the stepper motor;
    monitoring a rotation of the deflection device;
    increasing a strength of a current fed to the stepper motor when the rotation of the deflection device does not correspond to the control sequence; and
    triggering the stepper motor through a correction sequence of control defaults when the rotation of the deflection device does not correspond to the control sequence;
    wherein the correction sequence is selected such that interference perceptible to a human eye is prevented and/or corrected; and
    wherein the control sequence and the repeat frequency are selected such that when the deflection device rotates around the axis of rotation, the emitted laser light passes through one or more predetermined illumination areas more frequently and/or more slowly than other areas.

6. A rotary construction laser, comprising:
    a deflection device rotatably mounted around an axis of rotation for emitting laser light;
    a stepper motor for rotating the deflection device around the axis of rotation; and
    a transmission pulley which transmits a torque generated by the stepper motor to the deflection device.

7. The rotary construction laser according to claim 6, wherein:
    a rotor of the stepper motor is coupled with a drive shaft, wherein the drive shaft has a first pulley;
    the deflection device has a rotation shaft with a second pulley; and
    the transmission pulley transmits the torque from the first pulley to the second pulley.

8. The rotary construction laser according to claim 7, wherein the transmission pulley is a toothed belt and wherein the first and the second pulleys are each toothed belt pulleys.

* * * * *